United States Patent [19]

Himori

[11] Patent Number: 5,190,989
[45] Date of Patent: Mar. 2, 1993

[54] HYDROPHILIC GROUP-CONTAINING AB-TYPE BLOCK COPOLYMER

[75] Inventor: Shunichi Himori, Yokkaichi, Japan

[73] Assignee: Mitsubishi Petrochemical Company Limited, Tokyo, Japan

[21] Appl. No.: 620,389

[22] Filed: Nov. 30, 1990

Related U.S. Application Data

[63] Continuation of Ser. No. 209,587, Jun. 22, 1988, abandoned.

[30] Foreign Application Priority Data

Jun. 23, 1987 [JP] Japan ................. 62-154458

[51] Int. Cl.$^5$ .......................... C08F 2/50; C08F 4/00; C08F 293/00
[52] U.S. Cl. .................................... 522/57; 522/176; 522/182; 525/267; 525/301
[58] Field of Search .................. 522/57, 176, 182; 525/267, 301

[56] References Cited

U.S. PATENT DOCUMENTS 3,287,298 11/1966 D'Alelio ........................ 525/294
4,429,076 1/1984 Saito et al. .................... 525/301
4,604,425 8/1986 Ohmura et al. ................ 525/88

OTHER PUBLICATIONS

T. Otsu & A. Kuriyama; Living Radical Polymerization in Homogeneous System by Using Iniferter; J. Macromol. Sci.-Chem., A21 (8 & 9), pp. 961-977 (1984).
Polymer Bulletin, vol. 7, 1982, pp. 197-203, Springer-Verlag; T. Otsu et al; "Efficient Synthesis of Two or Multi Component Block Copolymers Through Living Radical Polymerization with Polymeric Photoiniferters".
Database Chemical Abstracts, (Host STN), 1985, No. 102(2):167246w, Columbus, Ohio, U.S.; T. Otsu et al: "Polymer Design by Iniferter Technique in Radical Polymerization: Synthesis of AB and ABA Block Copolymers Containing Random and Alternating Copolymer Sequences".
Polymer Bulletin, vol. 11, 1984, pp. 135-142, Springer-Verlag; T. Otsu et al "Living Mono- and Biradical Polymerizations in Homogeneous System Synthesis of AB and ABA Type Block Copolymers."

Primary Examiner—Marion E. McCamish
Assistant Examiner—Susan Berman
Attorney, Agent, or Firm—Oblon, Spivak, McClelland, Maier & Neustadt

[57] ABSTRACT

An AB-type block copolymer represented by formula (I):

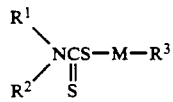

wherein $R^1$ represents a hydrocarbon group having 1 to 10 carbon atoms; $R^2$ represents a hydrogen atom or a hydrocarbon group having 1 to 10 carbon atoms; $R^3$ represents a benzyl group,

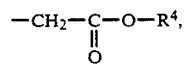

wherein $R^4$ represents an alkyl group having 1 to 10 carbon atoms, or an alkyl group having 1 to 18 carbon atoms; M represents a group represented by the formula $(M^2)_m$—$(M^1)_n$ or $(M^1)_m$—$(M^2)_n$, each of m and n being a natural number of 20 to 5000; is prepared by a process of first polymerizing either a monomer for forming the $M^1$ block or a monomer for forming the $M^2$ block in the presence of a sulfur-containing compound having formula (XIII):

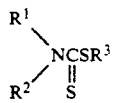

wherein $R^1$, $R^2$ and $R^3$ are as defined above so as to synthesize a polymer initiator having a dithiocarbamate group as indicated in formula (XIII) at the polymer terminal end, and then polymerizing the other monomer in the presence of the polymer initiator obtained in the first step; wherein the polymerization reactions in the first step and in the second step are carried out upon exposure of the monomers to ultraviolet radiation.

6 Claims, No Drawings

HYDROPHILIC GROUP-CONTAINING AB-TYPE BLOCK COPOLYMER

This application is a continuation of application Ser. No. 209,587, filed on Jun. 22, 1988, now abandoned.

BACKGROUND OF THE INVENTION

This invention relates to a hydrophilic group-containing AB-type block copolymer having a hydrophilic group-containing polymer chain and a polymer chain having affinity for a resin.

It has been already known that a block copolymer is useful for modifying the surface or interface of a resin and making its effect persistent.

The hydrophilic group-containing AB-type block copolymer of the present invention functions in such a manner that the hydrophilic group-containing polymer chain is oriented to the surface or interface of the resin to be modified, while the polymer chain having affinity for a resin is fixed to the resin. Accordingly, it can be used in various fields in which excellent properties possessed by hydrophilic groups such as water absorption capacity, antistatic properties, electrical conductivity, stain resistance, non-fogging, oil resistance, adhesiveness to metals, glass and ceramics, and compatibility with organisms are desired to be imparted to a resin. Specifically, it can be used for a paint additive, resin additive, surfactant, anti-foaming agent, flocculating agent, dispersant, builder, scale retarder, toner, adhesive, fibers, membrane, sealant, rubber, binder, water-absorptive resin, etc.

An attempt has heretofore been made to synthesize hydrophilic group-containing block copolymers which are expected to have the above mentioned excellent surface or interface modification effect, but has not been successful with radical polymerization methods. Meanwhile, Japanese Laid-Open Patent Publication No. 202261/84 has proposed that a hydrophilic group-containing block copolymer can be synthesized by use of a polymeric peroxide or a polyazo compound.

However, when a hydrophilic group-containing block copolymer is synthesized by the use of a polymeric peroxide or polyazo compound as mentioned above, the molecular weight of the resulting polymer can be controlled with difficulty and further homopolymers are by-produced whereby it is difficult to obtain a block copolymer of high purity.

SUMMARY OF THE INVENTION

An object of the present invention is to solve the above problems. The present inventor has found that a hydrophilic group-containing AB-type copolymer having a hydrophilic group-containing polymer chain and a polymer chain having affinity for a resin to be modified in combination can impart various excellent properties possessed by hydrophilic groups such as water absorption capacity, antistatic properties, electrical conductivity, stain resistance, non-fogging, oil resistance, adhesiveness to metals, glass and ceramics, and compatibility with organisms to the surface or interface of a resin to be modified, and also the effects are permanent, thereby accomplishing the present invention.

More specifically, the hydrophilic group-containing AB-type block copolymer is represented by the following formula (I):

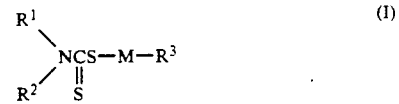

wherein $R^1$ represents a hydrocarbon group having 1 to 10 carbon atoms; $R^2$ represents a hydrogen atom or a hydrocarbon group having 1 to 10 carbon atoms; $R^3$ represents a benzyl group,

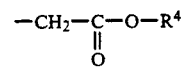

(wherein $R^4$ represents an alkyl group having 1 to 18 carbon atoms) or an alkyl group having 1 to 18 carbon atoms; M represents a group represented by the formula $(M^2)_m\text{-}(M^1)_n$ or $(M^1)_m\text{-}(M^2)_n$, each of m and n being a natural number of 20 to 5,000: $M^1$ represents a (meth)acrylate residue represented by the formula:

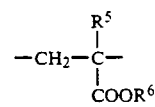

(wherein $R^5$ represents a hydrogen atom or a methyl group, and $R^6$ represents a hydrocarbon group having 1 to 18 carbon atoms) or an aromatic vinyl residue represented by the formula:

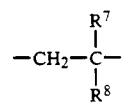

(wherein $R^7$ represents a hydrogen atom or a methyl group, $R^8$ represents a phenyl group, a halogenated phenyl group or an alkylphenyl group) or a fatty acid vinyl ester residue represented by the formula:

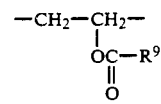

(wherein $R^9$ represents a hydrocarbon group having 1 to 18 carbon atoms); $M^2$ represents a hydrophilic group-containing vinyl residue represented by any one of the formulae (II) to (XII):

wherein $R^{10}$, $R^{11}$ each represent a hydrogen atom, a methyl or a hydroxyl group, and Z represents a hydrogen atom, an alkali metal atom, ammonium or an organic amine;

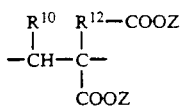
(III)

wherein $R^{10}$ and Z have the same meanings as in the formula (II), and $R^{12}$ represents an alkylene group having 1 to 10 carbon atoms;

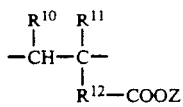
(IV)

wherein $R^{10}$, $R^{11}$ and Z have the same meanings as in the formula (II), and $R^{12}$ has the same meaning as in the formula (III);

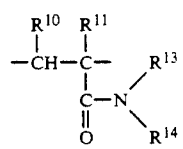
(V)

wherein $R^{10}$ and $R^{11}$ have the same meanings as in the formula (II), $R^{13}$ and $R^{14}$ each represent a hydrogen atom, an alkyl group having 1 to 10 carbon atoms or a sulfonated alkyl group represented by the formula —$R^{12}SO_3Z$ (wherein $R^{12}$ and Z have the same meanings as in the formula (III));

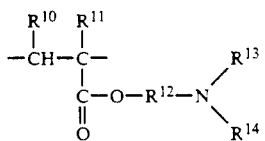
(VI)

wherein $R^{10}$, $R^{11}$ and $R^{12}$ have the same meanings as in the formula (IV), and $R^{13}$ and $R^{14}$ have the same meanings as in the formula (V);

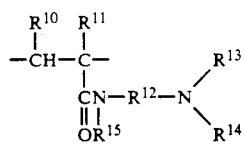
(VII)

wherein $R^{10}$, $R^{11}$, $R^{12}$, $R^{13}$ and $R^{14}$ have the same meanings as in the formula (VI), and $R^{15}$ represents a hydrogen atom, an alkyl group having 1 to 10 carbon atoms or a sulfonated alkyl group represented by the formula—$R^{12}SO_3Z$ (wherein $R^{12}$ and Z have the same meanings as in the formula (III));

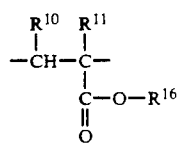
(VIII)

wherein $R^{16}$ represents a hydroxylated alkyl group having 1 to 18 carbon atoms and having at least one hydroxyl group, and $R^{10}$ and $R^{11}$ have the same meanings as in the formula (II);

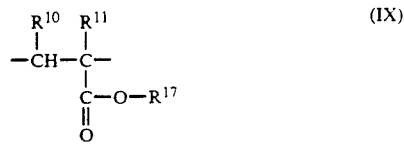
(IX)

wherein $R^{10}$ and $R^{11}$ have the same meanings as in the formula (II), and $R^{17}$ represents a polyethylene glycol group or a polypropylene glycol group represented by the formula

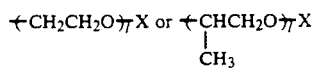

(wherein l represents a natural number of 1 to 10 and X represents a an alkyl group having 1 to 10 carbon atoms or Z, —$PO_3H_2$, —$PO_3HZ$ or —$PO_3Z_2$ (wherein Z has the same meaning as in the formula (II));

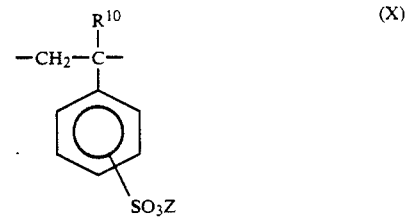
(X)

wherein $R^{10}$ and Z have the same meanings as in the formula (II);

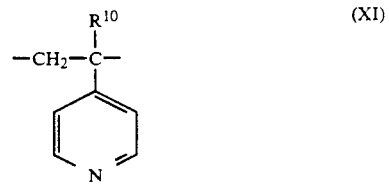
(XI)

wherein $R^{10}$ has the same meaning as in the formula (II); or

(XII)

wherein $R^{10}$, $R^{11}$ and Z have the same meanings as in the formula (II); and $M^2$ further represents a vinylpyrrolidone residue or an ammonium salt of the formula (V), (VI) or (VII).

DETAILED DESCRIPTION OF THE INVENTION

The residue contained in the formula (I) herein means recurring units of a monomer having vinyl group which have been bonded by addition polymerization.

The hydrophilic group-containing AB-type block coploymer according to the present invention has a structure that a hydrophilic group containing polymer chain and a polymer chain having affinity for a resin to be modified are chemically bonded in a straight chain.

When a composition is formed by compounding such AB block copolymer with a resin to be modified by means of, for example, melt kneading, it will take a morphology in which the free energy of such composition system as a whole becomes the minimum and therefore the hydrophilic group-containing polymer chain will be orientated to the surface or interface of the resin, while the resin-affinitive polymer chain will play a role to fix the polymer firmly on the resin. Accordingly, the AB-type block copolyemr modifies the surface or interface of the resin, and also easy bleed-out or easy peel-off of such AB-type block copolymer itself from the resin can be prevented.

Therefore, the hydrophilic group-containing AB-type block copolymer of the present invention can impart various properties inherent in hydrophilic group atoms onto the surface or interface of a resin, and also give permanency to such properties.

Monomers for forming the resin-affinitive polymer chain

The $M^1$ which forms the resin-affinitive polymer chain is a (meth)acrylic acid ester residue represented by the formula:

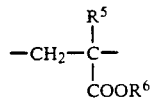

(wherein $R^5$ represents hydrogen atom or a methyl group, and $R^6$ represents a hydrocarbon group having 1 to 18 carbon atoms).

Examples of monomers forming the (meth)acrylic acid ester residue may include (meth)acrylates such as methyl (meth)acrylate, ethyl (meth)acrylate, n-butyl (meth)acrylate, isobutyl (meth)acrylate, hexyl (meth)acrylate, isooctyl (meth)acrylate, 2-ethylhexyl (meth)acrylate, isononyl (meth)acrylate, decyl (meth)acrylate, stearyl (meth)acrylate, and the like.

Alternatively, $M^1$ represents an aromatic vinyl residue represented by the formula:

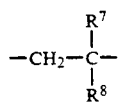

(wherein $R^7$ represents hydrogen atom or methyl group, and $R^8$ represents a phenyl group, a halogenated phenyl group or an alkylphenyl group).

Examples of the monomers for forming the aromatic vinyl residue may include styrene, p-methylstyrene, o-methylstyrene, α-methylstyrene, β-methylstyrene p-chloromethylstyrene, p-bromomethylstyrene and the like.

Alternatively, $M^1$ represents an aliphatic vinyl ester residue represented by the formula:

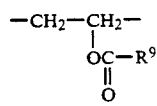

(wherein $R^9$ represents a hydrocarbon group having to 18 carbon atoms).

Examples of monomers for forming the aliphatic vinyl ester residue may include vinyl acetate, vinyl propionate, vinyl butyrate, vinyl caproate, vinyl 2-ethylhexanoate, vinyl laurate, vinyl stearate, etc.

Monomers for forming the hydrophilic group-containing polymer chain $M^2$ represents a hydrophilic group-containing vinyl residue represented by any one of the formulae (II) to (XII):

wherein $R^{10}$ and $R^{11}$ each represent a hydrogen atom, a methyl or hydroxyl group, and Z represents a hydrogen atom, an alkali metal, ammonium or an organic amine.

Examples of monomers for forming the hydrophilic group-containing vinyl residue of the formula (II) may include (meth)acrylic acid, crotonic acid, sodium (meth)acrylate, potassium crotonate, ammonium (meth)acrylate,

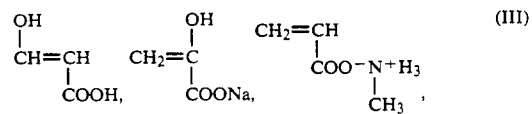

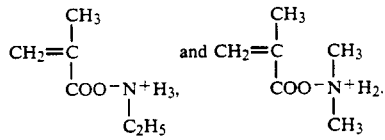

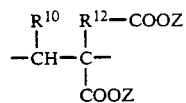

wherein $R^{10}$ and Z have the same meanings as in the formula (II), and $R^{12}$ represents an alkylene group having 1 to 10 carbon atoms.

Examples of monomers for forming the hydrophilic group-containing vinyl residue of the formula (III) include itaconic acid, sodium itaconate, ammonium itaconate,

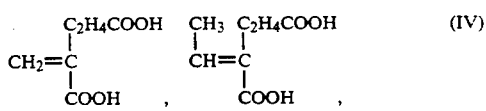

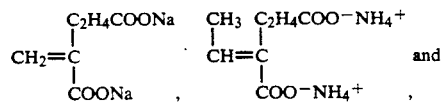

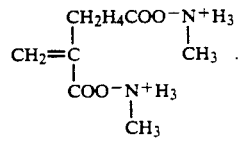

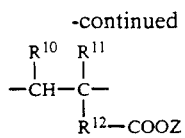

wherein $R^{10}$, $R^{11}$ and Z have the same meanings as in the formula (II), and $R^{12}$ has the same meaning as in the formula (III).

Examples of monomers for forming the hydrophilic group-containing vinyl residue of the formula (IV) may include:

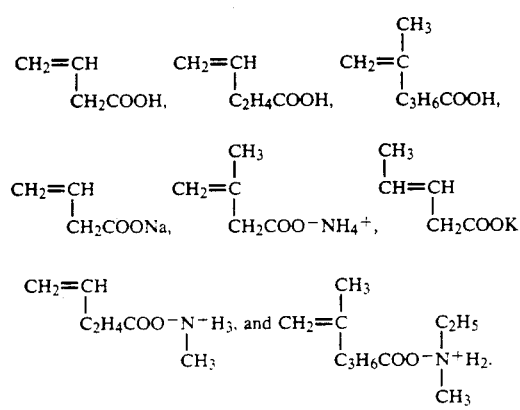

wherein $R^{10}$ and $R^{11}$ have the same meanings as in the formula (II), $R^{13}$ and $R^{14}$ each represent a hydrogen atom, an alkyl group having 1 to 10 carbon atoms or a sulfonated alkyl group represented by the formula—$R^{12}SO_3Z$ (wherein $R^{12}$ and Z have the same meanings as in the formula (III)).

Examples of monomers for forming the hydrophilic group-containing vinyl residue of the formula (V) may include (meth)acrylamide, N,N-dimethyl(meth)acrylamide,

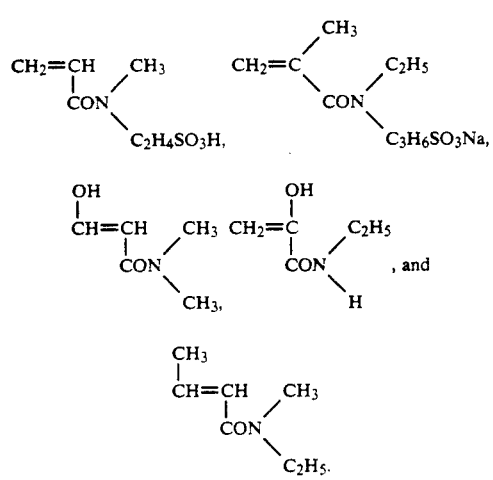

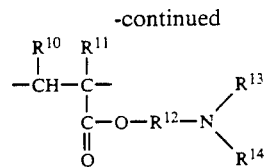

wherein $R^{10}$, $R^{11}$ and $R^{12}$ have the same meanings as in the formula (IV), and $R^{13}$ and $R^{14}$ have the same meanings as in the formula (V).

Examples of monomers for forming the hydrophilic group-containing vinyl residue of the formula (VI) may include:

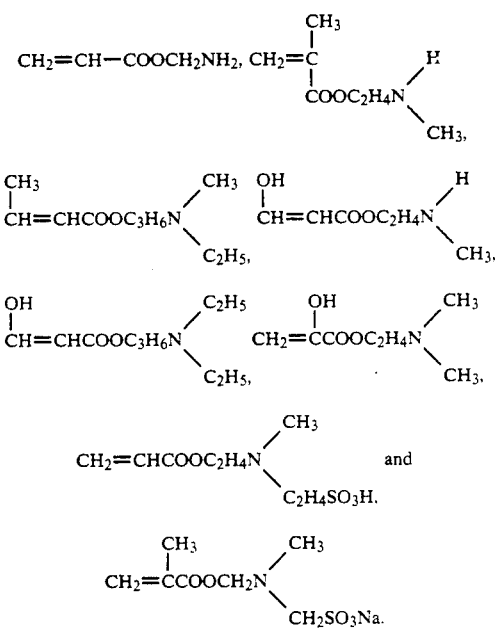

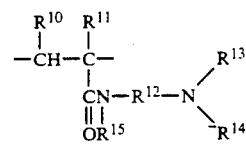

wherein $R^{10}$, $R^{11}$, $R^{12}$, $R^{13}$ and $R^{14}$ have the same meanings as in the formula (VI), and $R^{15}$ represents a hydrogen atom, an alkyl group having 1 to 10 carbon atoms or a sulfonated alkyl group represented by the formula—$R^{12}SO_3Z$ (wherein $R^{12}$ and Z have the same meanings as in the formula (III)). Examples of monomers for forming the hydrophilic group-containing vinyl residue of the formula (VII) may include:

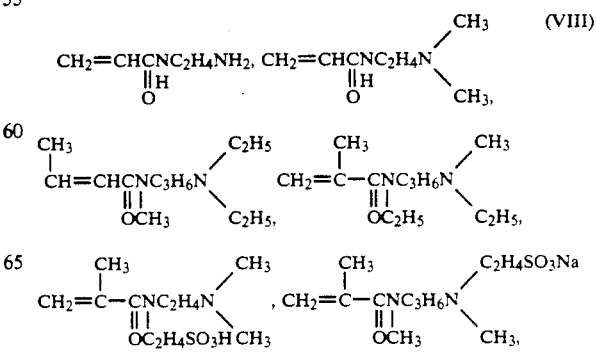

-continued

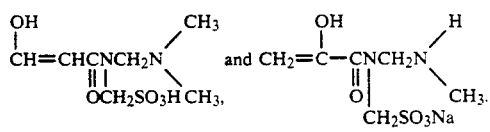

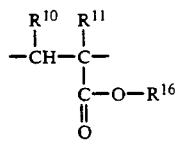

wherein $R^{16}$ represents a hydroxylated alkyl group having 1 to 18 carbon atoms and having at least one hydroxyl group, and $R^{10}$ and $R^{11}$ have the same meanings as in the formula (II).

Examples of monomers for forming the hydrophilic group-containing vinyl residue of the formula (VIII) may include 2-hydroxyethyl acrylate, 2-hydroxyethyl methacrylate,

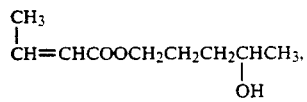 (IX)

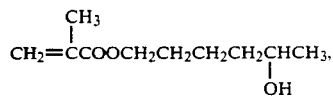

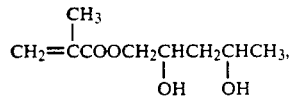

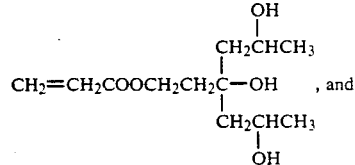, and

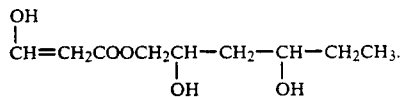

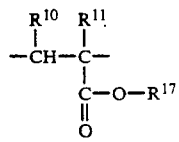

wherein $R^{10}$ and $R^{11}$ have the same meanings as in the formula (II), and $R^{17}$ represents a polyethylene glycol group or a polypropylene glycol group represented by the formula

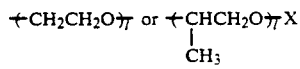

(wherein l represents a natural number of 1 to 10 and X represents an alkyl group having 1 to 10 carbon atoms or Z, $-PO_3H_2$, $-PO_3HZ$ or $-PO_3Z_2$ (wherein Z has the same meaning as in the formula (I) and (II)).

Examples of monomers for forming the hydrophilic group-containing vinyl residue of the formula (IX) may include:

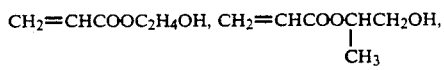

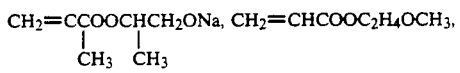

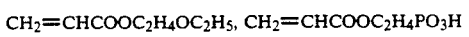

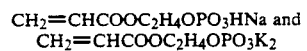

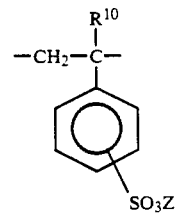

wherein $R^{10}$ and Z have the same meanings as in the formula (II).

Examples of monomers for forming the hydrophilic group-containing vinyl residue of the formula (X) may include:

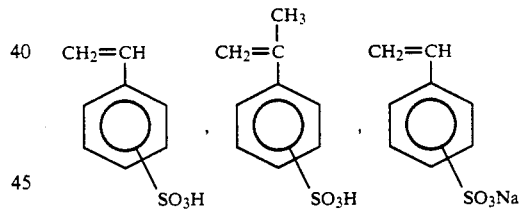

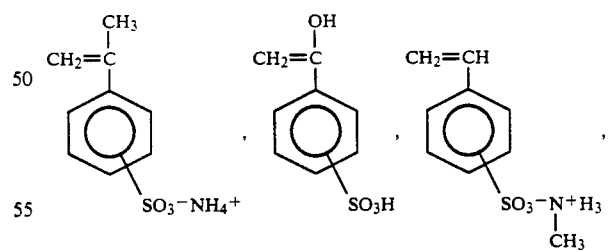

and

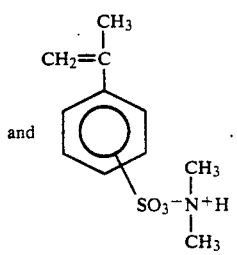

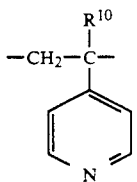 (XI)

wherein $R^{10}$ has the same meaning as in the formula (II).

Examples of monomers for forming the hydrophilic group-containing vinyl residue of the formula (XI) may include: wherein $R^{10}$, $R^{11}$ and Z have the same meanings as in the formula (II).

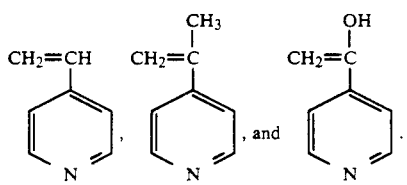

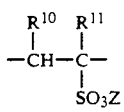 (XII)

Examples of monomers for forming the hydrophilic group-containing vinyl residue of the formula (XII) may include:

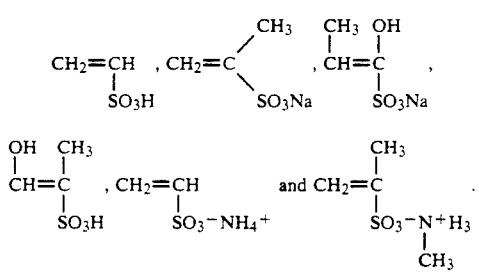

$M^2$ further represents a vinylpyrrolidone residue or an ammonium salt of the formula (V), (VI) or (VII). An example of monomers for forming the vinylpyrrolidone residue is vinylpyrrolidone, and examples of monomers for forming the ammonium salt of the formula (V) may include:

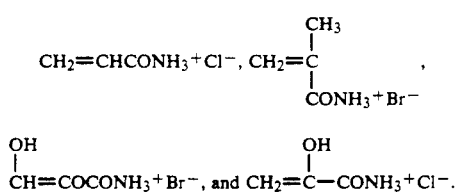

Examples of monomers for forming the ammonium salt of the formula (VI) may include:

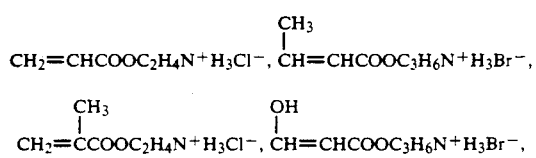

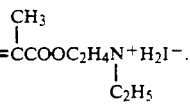

Examples of monomers for forming the ammonium salt of the formula (VII) may include:

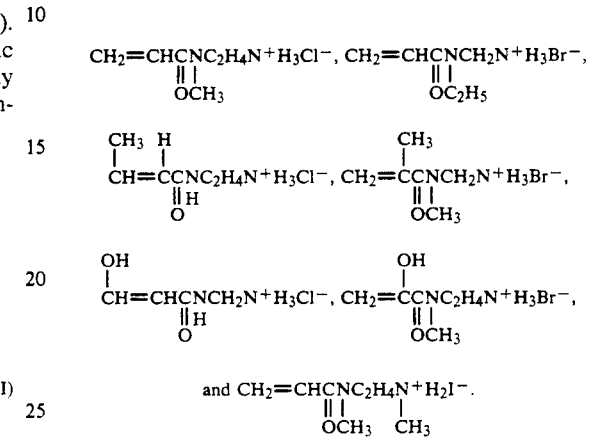

Specific examples of hydrophilic group-containing monomers for forming the hydrophilic group-containing polymer are as mentioned above, and at least one of these is used as a main component of the hydrophilic group-containing vinyl polymer. Other hydrophilic group-containing vinyl monomers, vinyl monomers and crosslinking agents than the above main component may also be used insofar as the modification effect of the block copolymer on the surface or interface of a polymer material is to be exhibited.

Preparation of block copolymer

The block copolymer of the present invention is produced by block copolymerization, as follows.

According to a typical method, one of the monomer $M^1$ for forming the resin-affinitive polymer chain and the monomer $M^2$ for forming the hydrophilic group-containing polymer chain is polymerized by the action of a radical polymerization initiator to form a polymer chain corresponding to the resin-affinitive polymer chain or the hydrophilic group-containing polymer chain and having at the terminal end a free radical source comprising a free radical or a precursor thereof (first step) and then polymerizing the other monomer with the free radical source (second step).

The radical polymerization initiator in this case should preferably have the functions of chain transfer and termination in combination. A specific example of such radical polymerization initiator is one which gives dithiocarbamate group to the terminal end of the polymer chain formed. The dithiocarbamate group formed at the terminal end of one block polymer chain is decomposed by giving light energy thereto to generate free radical, wherefrom formation of the other block is initiated.

The initiator preferably used in synthesis of the block copolymer according to the present invention, which has the functions of chain transfer and termination in combination in a radical polymerization process as set forth above, is called iniferter (Otsu, Kobunshi, 3, 222 (1984)). Specifically, it is a sulfur-containing compound and a typical example thereof is represented by the following formula (XIII). The block copolymer can be synthesized by the use of one or more kinds of the compounds.

(wherein $R^{18}$ represents a hydrocarbon group having 1 to 10 carbon atoms, $R^{19}$ represents a hydrogen atom or a hydrocarbon group having 1 to 10 carbon atoms, and $R^{20}$ represents a benzyl group,

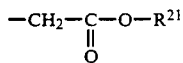

(wherein $R^{21}$ represents an alkyl group having 1 to 18 carbon atoms) or an alkyl group having 1 to 18 carbon atoms).

The hydrogen atom in $R^{20}$ may be substituted with a halogen, hydroxyl group, an alkoxyl group or carboxylic acid group, etc., unless the substitution remarkably changes the electronic state of the compound or remarkably increases the steric hindrance thereby lowering the ability of the compound as a radical polymerization initiator.

The compounds represented by the above formula can be synthesized with good yield from corresponding halides and dithiocarbamic acid salts. For example, N,N-diethylbenzyldithiocarbamate can be synthesized from benzyl bromide and sodium N,N-diethyldithiocarbamate.

In order for the compounds to function as the initiator through decomposition of themselves, to initiate the first step and the second step of block copolymerization, can be employed a UV-ray of wavelengths of 300 to 500 nm.

Copolymerization

As mentioned above, the block copolymer according to the present invention can be synthesized according to the following two steps.

First step: A first vinyl monomer is polymerized by the use of the above mentioned sulfur type radical polymerization initiator to synthesize a polymer initiator having a dithiocarbamate group at the polymer terminal end.

Second step: By the use of the polymer initiator synthesized in the first step, a second vinyl monomer is polymerized to form a block copolymer. Here, the dithiocarbamate at the polymer terminal end is decomposed to become a radical initiation site (as described in detail below).

In such two steps, the hydrophilic group-containing vinyl monomer can be used as the first monomer and the resin-affinitive vinyl monomer as the second monomer. Alternatively, the resin-affinitive vinyl monomer can be used as the first monomer and the hydrophilic group-containing vinyl monomer as the second monomer.

In the case of conducting photopolymerization through the first step and the second step, the polymerization system should be preferably maintained at a temperature of 150° C. or lower from the standpoint of protection of dithiocarbamate group.

When photopolymerization is employed in these steps, the polymerization system may be either homogeneous or heterogeneous, provided that sufficient light energy for dissociation can be transmitted to the initiation site. Usually, however, bulk polymerization or solution polymerization is used in the first step, while in the second step solution polymerization or polymerization in a solution having the polymer initiator dissolved in the second monomer is used.

A preferred solvent to be used for solution polymerization is one which has no characteristic absorption for UV-rays of a wavelength of 300-500 nm, has a small chain transfer constant and dissolves well the monomers and the polymers. Examples of such solvents include benzene, toluene, xylene, ethylbenzene, acetone, methyl ethyl ketone, ethyl acetate, dimethylformamide, isopropyl alcohol, butanol, hexane and heptane.

The average degree of polymerization or the molecular weight of each component of the block copolymer can be controlled by the molar ratio of the initiator to the monomer. For example, when 1 mol% of benzyl N,N-diethyldithiocarbamate is added to methyl methacrylate with a molecular weight as a monomer of 100, the number average molecular weight will be about 10,000 and the weight average molecular weight about 20,000. In the case of 0.1 mol%, they will be about 100,000 and about 200,000, respectively.

Similarly, in the second step, the molecular weight can be controlled by the molar ratio of the polymer initiator to the second monomer.

For a suitable block copolymer, the average degree of polymerization should be in the range of 20 to 5,000 with the hydrophilic group-containing polymer chain, 20 to 5,000 with the resin-affinitive polymer chain, and 40 to 10,000 with the block copolymer as a whole. If the average degree of polymerization of the hydrophilic group-containing polymer chain is less than 20, the block copolymer cannot sufficiently cover the surface or interface of a polymer material, whereby the effect of modifying the material will be insufficient. If it is over 5,000, on the other hand, the diffusion speed of the block copolymer is small, whereby it does not adequately migrate onto the surface or interface of a polymeric material thereby producing a poor effect of modification.

If the average degree of polymerization of the resin-affinitive polymerization chain is less than 20, the block copolymer has a low affinity for a polymeric material and thus is not fixed stably onto the material, leading to poor dispersion and easy bleeding out of the block copolymer. If it is over 5,000, the block copolymer does not migrate well onto the surface or interface of a polymeric material due to a small diffusion speed of the block copolymer, whereby the effect of modification will be insufficient.

Dithiocarbamate groups on both the ends of the block copolymer produced can be made inactive to the ultraviolet by a post treatment. The block copolymer may be made inactive to ultraviolet by, for example, heat treating the block copolymer for several minutes at a temperature of 250° C. or higher or by treating the block copolymer with acidic or alkaline solution. Alternatively, the carbamate terminals of the block copolymer can be substituted by UV-insensitive groups by, for example, adding under irradiation of the ultraviolet a chemical which has a large chain transfer constant such as a thiol compound.

Modification of surface characteristics

Modification of surface characteristics according to the present invention may be effected by compounding the specific block copolymer with a polymeric material. As a method for compounding, there may be employed a method in which a solution or dispersion of the specific block copolymer in a solvent is applied on the surface of a polymeric material, a method in which the block copolymer is compounded with a polymeric material during molding of the material, a method in which a film is formed after dissolving a polymeric material and the block copolymer in a solvent, a method in which the block polymer is formed into a sheet and pressurized under heating or adhered with an adhesive onto the surface of a polymeric material surface, or a method in which the block copolymer in the form of powder is attached by melting onto the surface of a polymeric material. Among such methods, preferred ones are those in which the block copolymer and the objective polymeric material are combined via their dissolved or melted state.

The amount of the block copolymer to be compounded may be 0.01 to 30 parts by weight, preferably 0.1 to 10 parts by weight, based on 100 parts by weight of a polymeric material. If the amount is less than 0.01 part by weight, the effect according to present invention will be insufficient, while characteristics inherent in a polymeric material may be deteriorated if it is in excess of 30 parts by weight.

EXAMPLES

The following examples are to illustrate some embodiments of the present invention without implying a limitation.

All parts and % in the examples are based on weight.

Preparation of block copolymer

PREPARATION 1

(First Step)

In a thermostat tank with an inner temperature of 50° C., a vessel made of Pyrex glass with a diameter of 3 cm and a volume of 300 ml was placed at a distance of 10 cm from a UV-ray lamp of an output of 400W (H 400L, produced by TOSHIBA CO.), and 100 g of styrene and 2.39 g of benzyl-N,N-diethyldithiocarbamate were charged into the vessel. After the vessel was replaced with nitrogen, it was sealed and photopolymerization was carried out under UV-ray irradiation by the above UV-ray lamp for 10 hours.

The polymer obtained was a pale yellow transparent solid, with the residual monomer amount being 1.6%. The number average molecular weight calculated on polystyrene (hereinafter abbreviated as "Mn") measured by gel permeation chromatography (GPC) was found to be 9,800, and the weight average molecular weight calculated on polystyrene (hereinafter abbreviated as "Mw") 22,000. This polymer is a polymeric initiator.

(Second Step)

A solution obtained by well mixing 40 g of powder obtained by pulverizing the polymer obtained in the first step, 40 g of 2-hydroxyethyl methacrylate and 160 g of methyl ethyl ketone was charged into the same vessel in the same device as used in the first step. After replacing the inside of the vessel with nitrogen, photopolymerization was carried out under UV-ray irradiation for 10 hours to obtain a translucent white polymer dispersion.

The polymer dispersion was subjected to reprecipitation with hexane followed by drying to obtain a block copolymer. The block copolymer was found to have Mn of 22,000 and Mw of 45,000 as measured by GPC, with the total amount of residual monomer being less than 1%. The percentage of block formation measured by solvent extraction was 86%.

PREPARATION 2

(First Step)

100 g of methyl methacrylate and 2.39 g of benzyl-N,N-diethyldithiocarbamate were charged into the same vessel in the same device as in Preparation 1, and photopolymerization was carried out in the same way as in Preparation 1. The polymer obtained was a pale yellow transparent solid, with the residual monomer amount being 1.0%. The polymer had Mn of 9,900 and Mw of 23,000.

(Second Step)

Except for using 40 g of the pulverized powder of the polymer obtained in the first step, 40 g of 2-hydroxyethyl methacrylate and 160 g of methyl ethyl ketone, photopolymerization and post-treatment were carried out in the same manner as in Preparation 1 to obtain a block copolymer. The copolymer was found to have Mn of 23,000 and Mw of 48,000, with the total amount of residual monomers being less than 1%. The percentage of block formation measured by solvent extraction was 82%.

PREPARATION 3

Except for using 40 g of the pulverized powder of the polymer obtained in the first step of Preparation 2, 40 g of acrylic acid and 160 g of methyl ethyl ketone, photopolymerization and post-treatment were carried out in the same manner as in the second step of Preparation 1 to obtain a block copolymer. The copolymer was found to have Mn of 22,000 and Mw of 46,000, with the total amount of residual monomers being less than 1%. The percentage of block formation measured by solvent extraction was 84%.

PREPARATION 4

Except for using 40 g of the pulverized powder of the polymer obtained in the first step of Preparation 2, 40 g of sodium styrenesulfonate, 80 g of methanol and 80 g of acetone, photopolymerization and post-treatment were carried out in the same manner as in the second step of Preparation 1 to obtain a block copolymer. The copolymer was found to have Mn of 21,000 and Mw of 46,000, with the total amount of residual monomers being less than 1%. The percentage of block formation measured by solvent extraction was 78%.

PREPARATION 5

(First Step)

Except for using 100 g of methyl methacrylate and 2.47 g of ethyl 2-N,N-diethyldithiocarbamylisobutyrate, photopolymerization and post-treatment were carried out in the same manner as in the first step of Preparation 1 to obtain a polymer with Mn of 9,800 and Mw of 22,000.

(Second Step)

Except for using 40 g of the pulverized powder of the polymer obtained in the first step, 40 g of 2-hydroxyethyl methacrylate and 160 g of methyl ethyl ketone, photopolymerization and post-treatment were carried out in the same manner as in the second step of Preparation 1 to obtain a block copolymer. The copolymer was found to have Mn of 23,000 and Mw of 49,000, with the total amount of residual monomers being less than 1%. The percentage of block formation measured by solvent extraction was 80%.

EXAMPLE 1

100 parts of polystyrene resin powder and 5 parts of the block copolymer obtained in Preparation 1 were kneaded by an extruder to form a sheet, and further press molded to obtain a sheet with a thickness of 0.5 mm.

The sheet was not colored, with no bleeding out onto the surface, and was good in processability.

For this sheet and a sheet formed similarly from the polystyrene resin alone as a comparative testing sample their surface resistance values and contact angles with pure water were measured (measurement conditions: relative humidity: 30%, temperature: 20° C.). The results are shown in Table 1.

Note (The same holds in the following Tables):

TABLE 1

| Resin | Surface resistance*[1] | Contact angle*[2] |
|---|---|---|
| Polystyrene resin blended with block copolymer | $3 \times 10^5$ Ω | 50° |
| Polystyrene resin | $5 \times 10^{13}$ Ω | 95° |

*[1] measured by means of a surface resistance measuring instrument produced by Sanko Seiki K.K.
*[2] measured by means of a FACE contact angle needle (Model CA-D) produced by Kyowa Kaimen Kaguku, K.K.

As is apparent from Table 1, the sheet formed from polystyrene blended with the block copolymer has remarkably low surface resistance value and contact angle as compared with the sheet formed from the resin blended with no block copolymer showing clearly the surface modifying effect of the block copolymer.

Next, the surface of the sheet formed from the resin blended with the block copolymer was washed with tap water of 25° C. at a flow rate of 2 liter/min. for one hour, and then the same measurements were made to give entirely the same results with those before water washing.

EXAMPLE 2

100 Parts of polyvinyl acetate resin powder and 5 parts of the block copolymer obtained in Preparation 2 were processed in the same manner as in Example 1 to form a sheet. The sheet obtained was not colored, without bleeding and was also good in processability. The sheet and a sheet formed similarly from the polyvinyl acetate resin alone were subjected to the same measurement as in Example 1 to give the results as shown in Table 2.

TABLE 2

| Resin | Surface resistance | Contact angle |
|---|---|---|
| Polyvinyl acetate resin blended with block copolymer | $6 \times 10^6$ Ω | 40° |
| Polyvinyl acetate resin | $5 \times 10^{15}$ Ω | 80° |

As is apparent from Table 2, the surface characteristics of the resin were remarkably modified by the addition of the block copolymer. When the same measurements were made on the sheet formed from the resin blended with the block copolymer after washing the sheet with water in the same manner as in Example 1, the results were found to be the same with those before water washing.

EXAMPLE 3

100 Parts of polyvinyl chloride resin powder and 5 parts of the block copolymer obtained in Preparation 2 were formed into a sheet in the same manner as in Example 1. The sheet obtained was not colored, without bleeding and was good in processability. The characteristics' values measured in the same manner as in Example 1 are as shown in Table 3.

TABLE 3

| Resin | Surface resistance | Contact angle |
|---|---|---|
| Polyvinyl chloride resin blended with block copolymer | $2 \times 10^5$ Ω | 45° |
| Polyvinyl chloride resin | $5 \times 10^{16}$ Ω | 81° |

As is apparent from Table 3, the surface characteristics of the resin were remarkably modified by the addition of the block copolymer. When the same measurements were made on the sheet formed from the resin blended with the block copolymer after washing the sheet with water in the same manner as in Example 1, the results were found to be the same with those before water washing.

EXAMPLE 4

A sheet was prepared according to the procedure of Example 1 except for using 100 parts of polyvinylidene fluoride resin powder and 5 parts of the block copolymer obtained in Preparation 2. The sheet obtained was not colored, without bleeding and was good in processability. The characteristics' values measured in the same manner as in Example 1 are as shown in Table 4.

TABLE 4

| Resin | Surface resistance | Contact angle |
|---|---|---|
| Polyvinylidene fluoride resin blended with block copolymer | $3 \times 10^6$ Ω | 60° |
| Polyvinylidene fluoride resin | $5 \times 10^{16}$ Ω | 105° |

As is apparent from Table 4, the surface characteristics of the resin were remarkably modified by the addition of the block copolymer. When the same measurements were made on the sheet formed from the resin blended with the block copolymer after washing the sheet with water in the same manner as in Example 1, the results were found to be the same with those before water washing.

EXAMPLE 5

A sheet with a thickness of 1 mm was obtained in the same manner as in Example 1 except for using 100 parts of polyisoprene rubber and 5 parts of the block copolymer obtained in Preparation 2. The sheet was not colored, without bleeding and good in processability. For this sheet and a sheet formed from the resin blended with no block copolymer, surface resistance values and surface resistivity values after friction were measured to give the results as shown in Table 5.

TABLE 5

| Resin | Surface resistance | Surface resistance after rubbing[1)] |
|---|---|---|
| Polyisoprene rubber blended with block copolymer | $6 \times 10^6 \, \Omega$ | $6 \times 10^6 \, \Omega$ |
| Polyisoprene rubber | $3 \times 10^{14} \, \Omega$ | $5 \times 10^{16} \, \Omega$ |

Note
(The same holds in Table 6):
[1)]measured after rubbing the sheet with a cotton cloth for 3 minutes using Rotary Static Tester (produced by Koashokai K.K., rotating speed:150 rpm) under the same environmental conditions as in Example 1.

As is apparent from Table 5, the sheet formed from the resin blended with the block copolymer has a low surface resistance value and the value is not changed after rubbing. In contrast, the sheet formed from the resin blended with no block copolymer has a high resistance value, and the value rises further higher after rubbing. When the same measurements were made on the sheet formed from the resin blended with the block copolymer after washing the sheet with water in the same manner as in Example 1, the results were found to be the same with those before water washing.

EXAMPLE 6

100 Parts of polymethyl methacrylate resin and 5 parts of the block copolymer obtained in Preparation 2 were dissolved in ethyl acetate, and a film was prepared according to the solvent film formation method. The film obtained was not colored, with no bleeding.

For this film, and a film formed in the same manner except for not using the block copolymer at all, surface resistivity values and surface resistance values after rubbing were measured. The results are as shown in Table 6.

TABLE 6

| Resin | Surface resistance | Surface resistance after rubbing |
|---|---|---|
| Polymethyl methacrylate resin blended with block copolymer | $7 \times 10^6 \, \Omega$ | $7 \times 10^6 \, \Omega$ |
| Polymethyl methacrylate resin | $5 \times 10^{15} \, \Omega$ | $5 \times 10^{16} \, \Omega$ |

As regards the film prepared with addition of the block copolymer, the surface resistance value is not changed after rubbing, thus exhibiting very good antistatic effect. When the same measurements were made on the film after washing the film with water in the same manner as in Example 1, the results were found to be the same with those before water washing.

EXAMPLE 7

A dispersion of 30 parts of the block copolymer obtained in Preparation 2 in 100 parts of ethyl acetate was coated on an acrylic resin plate by means of bar coating so that the thickness of the coating after drying would be 8 μ, and dried at room temperature for 2 hours and further at 60° C. for 2 hours. The surface resistance value and the contact angle with pure water of the resulting acrylic resin plate were measured under the same conditions as in Example 1. The results are as shown in Table 7.

TABLE 7

| Resin | Surface resistance | Contact angle |
|---|---|---|
| Acrylic resin plate coated with block copolymer | $8 \times 10^6 \, \Omega$ | 45° |
| Acrylic resin plate | $5 \times 10^{16} \, \Omega$ | 80° |

As is apparent from Table 7, the resin plate coated with the block copolymer has a remarkably low surface resistance value and contact angle as compared with the plate not coated with the block copolymer. When the same measurements were made on the plates coated with the block copolymer after washing the plate with water in the same manner as in Example 1, the results were found to be the same with those before washing.

EXAMPLE 8

A mixture of 100 parts of an acrylic resin varnish for paint (solution in ethyl acetate with solid content of 30%) with 2 parts of the block copolymer obtained in Preparation 2, which mixture had a viscosity of 19 to 20 sec. as measured by Ford cup No.4, was spray coated onto a polymethyl methacrylate resin sheet previously washed with ethanol, and dried at 60° C. for one hour. For the coated sheet obtained and the sheet similarly coated with the acrylic resin varnish not blended with the block copolymer, the same measurements as in Example 1 were conducted to obtain the results as shown in Table 8.

TABLE 8

| Resin | Surface resistance | Contact angle |
|---|---|---|
| Polymethyl methacrylate resin sheet coated with varnish blended with block copolymer | $3 \times 10^6 \, \Omega$ | 45° |
| Polymethyl methacrylate resin sheet coated with varnish | $5 \times 10^{16} \, \Omega$ | 82° |

As is apparent from the results in Table 8, the resin sheet coated with the varnish blended with the block copolymer has both remarkably low surface resistance value and contact angle as compared with the sheet coated with the varnish blended with no block copolymer. When the same measurements were made on the sheet coated with the varnish blended with the block copolymer after washing the coated sheet with water in the same manner as in Example 1, the results were found to be the same with those before washing.

EXAMPLE 9

A sheet was prepared in the same manner as in Example 1, except for using 100 parts of polymethyl methacrylate resin and 5 parts of the block copolymer obtained in Preparation 4, and its surface characteristics were measured similarly as in Example 1. The results are as shown in Table 9. The sheet obtained was not colored, without bleeding, and was good in processability.

TABLE 9

| Resin | Surface resistance | Contact angle |
|---|---|---|
| Polymethyl methacrylate resin blended with block copolymer | $6 \times 10^6 \, \Omega$ | 56° |
| Polymethyl methacrylate resin | $5 \times 10^{15} \, \Omega$ | 80° |

As is apparent from the results in Table 9, the sheet formed from the resin blended with the block copolymer has both remarkably low surface resistance value and contact angle as compared with the sheet prepared with addition of no block copolymer. When the same measurements were made on the sheet formed from the resin blended with the block copolymer after washing the sheet with water in the same manner as in Example 1, the results were found to be the same with those before water washing.

EXAMPLE 10

A sheet was prepared in the same manner as in Example 1, except for using 100 parts of methyl methacrylate resin and the block copolymer obtained in Preparation 4, and its surface characteristics were measured similarly as in Example 1. The results are as shown in Table 10. The sheet obtained was not colored, without bleeding, and was good in processability.

TABLE 10

| Resin | Surface resistance | Contact angle |
|---|---|---|
| Methyl methacrylate resin blended with block copolymer | $3 \times 10^5 \, \Omega$ | 45° |
| Methyl methacrylate resin | $5 \times 10^{15} \, \Omega$ | 80° |

As is apparent from Table 10, the sheet formed from the resin blended with the block copolymer has both remarkably low surface resistance value and contact angle as compared with the sheet prepared with addition of no block copolymer. When the same measurements were made on the sheet formed from the resin blended with the block copolymer after washing the sheet with water in the same manner as in Example 1, the results were found to be the same with those before water washing.

EXAMPLE 11

A sheet was prepared in the same manner as in Example 1, except for using 100 parts of polymethyl methacrylate resin and the block copolymer obtained in Preparation 5. The sheet obtained was not colored, without bleeding, and was good in processability. The surface characteristics of the sheet were measured similarly as in Example 1. The results are as shown in Table 11.

TABLE 11

| Resin | Surface resistance | Contact angle |
|---|---|---|
| Polymethyl methacrylate resin blended with block copolymer | $3 \times 10^6 \, \Omega$ | 40° |
| Polymethyl methacrylate resin | $15 \times 10^{15} \, \Omega$ | 80° |

As is apparent from Table 11, the sheet formed from the resin blended with the block copolymer has both remarkably low surface resistivity value and contact angle as compared with the sheet prepared with addition of no block copolymer. When the same measurements were made on the sheet formed from the resin blended with the block copolymer after washing the sheet with water in the same manner as in Example 1, the results were found to be the same with those before water washing.

EXAMPLE 12

A mixture of 100 parts of an acrylic resin varnish for paint (solution in ethyl acetate with solid content of 30%) with 2 parts of the block copolymer obtained in Preparation 3, which mixture had a viscosity of 19 to 20 sec. as measured by Ford cup No. 4, was spray coated on the various plates shown in Table 13 previously washed with ethanol, and dried at 60° C. for one hour. Also, the same varnish blended with no block copolymer was similarly coated on the various substrates, followed by drying. For the resulting coated plates, adhesiveness between the coatings and the various base plates was evaluated. The results are as shown in Table 12.

TABLE 12

| Base plate | Varnish coating blended with block copolymer | Varnish coating blended with no block copolymer |
|---|---|---|
| Glass | 100/100 | 0/100 |
| aluminum | 100/100 | 0/100 |
| Copper | 100/100 | 80/100 |
| Tinplate | 100/100 | 80/100 |
| Zinc-plated steel | 100/100 | 80/100 |
| Stainless steel (SUS 304) | 100/100 | 10/100 |

Note:
Test method: the checker cellophane tape peel-off test.

As is apparent from Table 12, the coatings of the acrylic resin blended with the block copolymer exhibit remarkably enhanced adhesiveness to the various base plates as compared with the coatings without addition of the block copolymer, which clearly shows the surface (interface) modification effect of the block copolymer. When the same adhesion test was conducted after dipping the various plates coated with the varnish in tap water of 25° C. for 24 hours, both of the coatings blended with the block copolymer and blended with no block copolymer showed the same results with those before water dipping.

What is claimed is:

1. An AB-type block copolymer represented by formula (I):

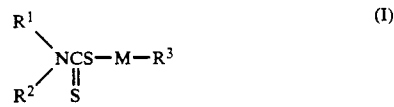

wherein $R^1$ represents a hydrocarbon group having 1 to 10 carbon atoms; $R^2$ represents a hydrogen atom or a hydrocarbon group having 1 to 10 carbon atoms; $R^3$ represents a benzyl group,

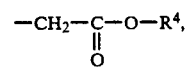

wherein $R^4$ represents an alkyl group having 1 to 10 carbon atoms, or an alkyl group having 1 to 18 carbon atoms; M represents a group represented by the formula $(M^2)_m\text{-}(M^1)_n$ or $(M^1)_m\text{-}(M^2)_n$, each of m and n being a natural number of 20 to 5,000; $M^1$ represents a (meth)acrylate residue represented by the formula:

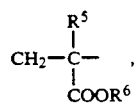

wherein $R^5$ represents a hydrogen atom or a methyl group, and $R^6$ represents a hydrocarbon group having 1 to 18 carbon atoms, or an aromatic vinyl residue represented by the formula:

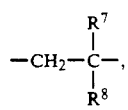

wherein $R^7$ represents a hydrogen atom or a methyl group, $R^8$ represents a phenyl group, a halogenated phenyl group or an alkylphenyl group or a fatty acid vinyl ester residue represented by the formula:

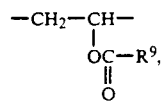

wherein $R^9$ represents a hydrocarbon group having 1 to 18 carbon atoms, $M^2$ represents a hydrophilic group-containing vinyl residue represented by any one of the formulae (II) to (XII):

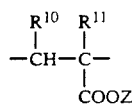
(II)

wherein $R^{10}$, $R^{11}$ each represent a hydrogen atom, a methyl or a hydroxyl group, and Z represents a hydrogen atom, an alkali metal atom, ammonium or an organic amine;

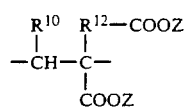
(III)

wherein $R^{10}$ and Z have the same meanings as in the formula (II), and $R^{12}$ represents an alkylene group having 1 to 10 carbon atoms;

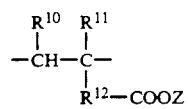
(IV)

wherein $R^{10}$, $R^{11}$ and Z have the same meanings as in the formula (II), and $R^{12}$ has the same meaning as in the formula (III):

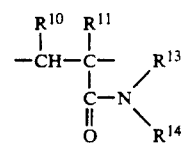
(V)

wherein $R^{10}$ and $R^{11}$ have the same meanings as in the formula (II), $R^{13}$ and $R^{14}$ each represent a hydrogen atom, an alkyl group having 1 to 10 carbon atoms or a sulfonated alkyl group represented by the formula —$R^{12}SO_3Z$, wherein $R^{12}$ and Z have the same meanings as in the formula (III):

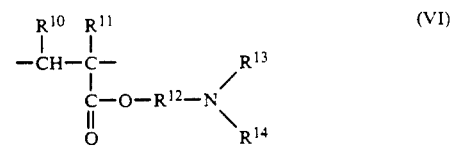
(VI)

wherein $R^{10}$, $R^{11}$ and $R^{12}$ have the same meanings as in the formula (IV), and $R^{13}$ and $R^{14}$ have the same meanings as in the formula (V):

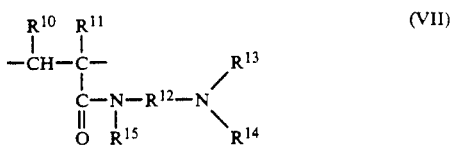
(VII)

wherein $R^{10}$, $R^{11}$, $R^{12}$, $R^{13}$ and $R^{14}$ have the same meanings as in the formula (VI), and $R^{15}$ represent a hydrogen atom, an alkyl group having 1 to 10 carbon atoms or a sulfonated alkyl group represented by the formula —$R^{12}SO_3Z$, wherein $R^{12}$ and Z have the same meanings as in the formula (III):

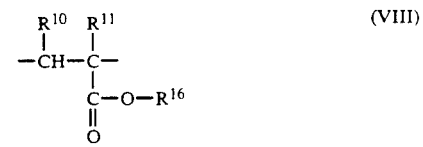
(VIII)

wherein $R^{16}$ represents a hydroxylated alkyl group having 1 to 18 carbon atoms and having at least one hydroxyl group, and $R^{10}$ and $R^{11}$ have the same meanings as in the formula (II):

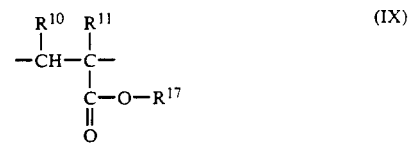
(IX)

wherein $R^{10}$ and $R^{11}$ have the same meanings as in the formula (II), and $R^{17}$ represents a polyethylene glycol group or a polypropylene glycol group represented by the formula:

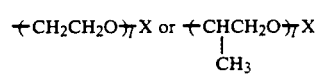

wherein l represents a natural number of 1 to 10 and X represents an alkyl group having 1 to 10 carbon atoms or Z, —$PO_3H_2$, —$PO_3HZ$ or —$PO_3Z_2$, wherein Z has the same meaning as in the formula (II)

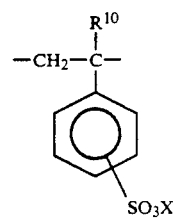

wherein $R^{10}$ and Z have the same meanings as in formula (II):

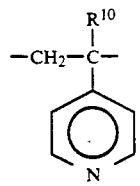

wherein $R^{10}$ has the same meaning as in formula (II); or

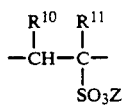  (XII)

wherein $R^{10}$, $R^{11}$ and Z have the same meanings as in formula (II); and $M^2$ further represents a vinylpyrrolidone residue or an ammonium salt of the formula (V), (VI) or (VII), prepared by a process, comprising:

a first step of polymerizing either a monomer for forming the $M^1$ block or a monomer for forming the $M^2$ block in the presence of a sulfur-containing compound having formula (XIII):

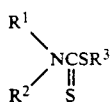  (XIII)

wherein $R^1$, $R^2$ and $R^3$ are as defined above so as to synthesize a polymer initiator having a dithiocarbamate group as indicated in formula (XIII) at the polymer terminal end; and a second step of polymerizing the other monomer in the presence of the polymer initiator obtained in the first step; wherein the polymerization reactions in the first step and in the second step are carried out upon exposure to ultraviolet radiation.

2. The block copolymer according to claim 1, wherein the residue $M^1$ is formed from a (meth)acrylate monomer selected from the group consisting of methyl (meth)acrylate, ethyl (meth)acrylate, n-butyl (meth)acrylate, isobutyl (meth)acrylate, hexyl (meth)acrylate, isooctyl (meth)acrylate, 2-ethylhexyl (meth)acrylate, isononyl (meth)acrylate, decyl (meth)acrylate and stearyl (meth)acrylate.

3. The block copolymer according to claim 1, wherein the residue $M^2$ is represented by the formula (II) and formed from a hydrophilic group-containing vinyl monomer selected from the group consisting of (meth)acrylic acid, crotonic acid, sodium (meth)acrylate, potassium crotonate, ammonium (meth)acrylate,

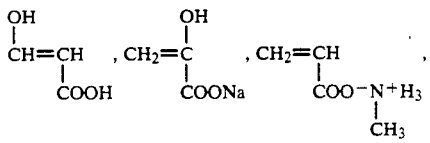

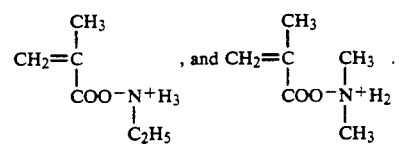

4. A polymer composition comprising a polymeric material and the block copolymer according to claim 1.

5. The polymer composition according to claim 4, wherein the amount of the block copolymer added is 0.01 to 30 parts by weight based on 100 parts by weight of the polymeric material.

6. A process for producing the block copolymer according to claim 1, comprising the steps of:

a first step of polymerizing either a monomer for forming the $M^1$ block or a monomer for forming the $M^2$ block in the presence of a sulfur-containing compound having formula (XIII):

  (XIII)

wherein $R^1$ represents a hydrocarbon group having 1 to 10 carbon atoms; $R^2$ represents a hydrogen atom or a hydrocarbon group having 1 to 10 carbon atoms; $R^3$ represents a benzyl group,

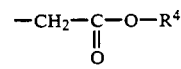

wherein $R^4$ represents an alkyl group having 1 to 18 carbon atoms or an alkyl group having 1 to 18 carbon atoms; so as to synthesize a polymer initiator having a dithiocarbamate group as indicated in formula (XIII) at the polymer terminal end; and a second step of polymerizing the other monomer in the presence of the polymer initiator obtained in the first step; wherein the polymerization reactions in the first step and in the second step are carried out upon exposure to ultraviolet rays.

* * * * *